US010470189B2

(12) United States Patent
Tran et al.

(10) Patent No.: US 10,470,189 B2
(45) Date of Patent: Nov. 5, 2019

(54) FACILITATION OF EFFICIENT SOFTWARE DOWNLOADS FOR VEHICLES

(71) Applicant: AT&T Intellectual Property I, L.P., Atlanta, GA (US)

(72) Inventors: Lien K. Tran, Chatham, NJ (US); Simon D. Byers, Summit, NJ (US); Carlos Eduardo De Andrade, Highland Park, NJ (US); Emir Halepovic, Somerset, NJ (US); David John Poole, Maplewood, NJ (US); Christopher T. Volinsky, Morristown, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 159 days.

(21) Appl. No.: 15/193,685

(22) Filed: Jun. 27, 2016

(65) Prior Publication Data

US 2017/0374668 A1    Dec. 28, 2017

(51) Int. Cl.
*H04W 72/04* (2009.01)
*H04L 29/08* (2006.01)
*H04L 12/24* (2006.01)

(52) U.S. Cl.
CPC ......... *H04W 72/0486* (2013.01); *H04L 41/08* (2013.01); *H04L 67/12* (2013.01);
(Continued)

(58) Field of Classification Search
CPC ........... H04W 72/0486; H04W 72/048; H04W 48/16; H04W 24/02; H04L 67/12; H04L 67/142; H04M 1/72572
See application file for complete search history.

(56) References Cited

U.S. PATENT DOCUMENTS 6,948,171 B2    9/2005    Dan et al.
7,366,589 B2    4/2008    Habermas
(Continued)

FOREIGN PATENT DOCUMENTS

EP        2958347 A1    12/2013
KR    20100072781 A    7/2010
(Continued)

OTHER PUBLICATIONS

"Software Updates on the Efficient Use of Connected Cars," Auto Tech Review, Apr. 2014, 3 pages. http://autotechreview.com/news/item/1223softwareupdatesontheeffcientuseofconnectedcars.html. Retrieved on Sep. 27, 2016.
(Continued)

*Primary Examiner* — Vinncelas Louis
(74) *Attorney, Agent, or Firm* — Amin, Turocy & Watson, LLP

(57) ABSTRACT

A more efficient over-the-air software push can be facilitated by leveraging a smart scheduling system for vehicles. The smart scheduling system can use location and network capacity data to prioritize over-the-air software pushes for vehicles. For instance, a vehicle, which is only operational during off-peak wireless network hours can receive a software push during the off-peak times because wireless network capacity is not an issue. However, vehicles, which are used primarily during heavy peak wireless network times can receive software in a prioritized manner based on location data, frequency of use, network capacity, etc.

20 Claims, 12 Drawing Sheets

(52) U.S. Cl.
CPC ........... *H04L 67/34* (2013.01); *H04W 72/048* (2013.01); *H04L 67/18* (2013.01)

(56) References Cited

U.S. PATENT DOCUMENTS

| | | | |
|---|---|---|---|
| 8,036,690 B1* | 10/2011 | Delker | H04W 4/18 455/115.3 |
| 8,190,322 B2 | 5/2012 | Lin et al. | |
| 8,239,852 B2 | 8/2012 | Etchegoyen | |
| 8,321,858 B1 | 11/2012 | Marmaros et al. | |
| 8,868,796 B1 | 10/2014 | Wojcik et al. | |
| 8,875,123 B2 | 10/2014 | Shiba | |
| 9,063,818 B1 | 6/2015 | Risbood et al. | |
| 9,298,649 B2 | 3/2016 | Pandya et al. | |
| 9,323,546 B2 | 4/2016 | Rork et al. | |
| 2006/0089160 A1* | 4/2006 | Othmer | H04M 1/72572 455/457 |
| 2007/0260399 A1* | 11/2007 | Abraham | B64G 1/1014 342/357.43 |
| 2008/0005733 A1 | 1/2008 | Ramachandran et al. | |
| 2010/0082559 A1 | 4/2010 | Sumcad et al. | |
| 2013/0344802 A1 | 12/2013 | Armour et al. | |
| 2014/0059534 A1 | 2/2014 | Daum et al. | |
| 2014/0068596 A1 | 3/2014 | Mota | |
| 2014/0092755 A1* | 4/2014 | van de Ven | H04W 48/16 370/252 |
| 2014/0165070 A1 | 6/2014 | Persikov et al. | |
| 2014/0285146 A1* | 9/2014 | Huston | B60L 11/1816 320/109 |
| 2014/0310426 A1* | 10/2014 | Damola | H04L 67/325 709/235 |
| 2014/0310702 A1 | 10/2014 | Ricci et al. | |
| 2014/0359131 A1 | 12/2014 | Seed et al. | |
| 2015/0169311 A1 | 6/2015 | Dickerson et al. | |
| 2015/0180840 A1 | 6/2015 | Jung et al. | |
| 2015/0301821 A1 | 10/2015 | Danne et al. | |
| 2015/0381413 A1 | 12/2015 | Word | |
| 2016/0020987 A1 | 1/2016 | Wetterwald et al. | |
| 2016/0080235 A1* | 3/2016 | Tan | H04L 43/0888 370/235 |
| 2016/0337525 A1* | 11/2016 | Da Silva | H04L 12/1485 |
| 2017/0156068 A1* | 6/2017 | Frenger | H04W 24/02 |
| 2017/0163501 A1* | 6/2017 | Lazarescu | H04L 67/142 |

FOREIGN PATENT DOCUMENTS

| | | |
|---|---|---|
| WO | 2015131351 A1 | 9/2015 |
| WO | 2015176098 A1 | 11/2015 |

OTHER PUBLICATIONS

Sudharshana, et al. "OTA Mobile Device Software Management," Proceeding of the SDR 02 Technical Conference and Product Exposition, 2002, SDR Forum, 7 pages. http://citeseerx.ist.psu.edu/viewdoc/download?; doi=10.1.1.114.1274&rep=rep1&type=pdf. Retrieved on May 6, 2016.

"Tesla uses OTA software update to fix hacking weakness," Telematics News, Aug. 10, 2015, 2 pages. http://telematicsnews.info/2015/08/10/teslausesotasoftwareupdatetofixhackingweakness_au6106/. Retrieved on May 6, 2016.

Mansor et al., "Don't Brick Your Car: Firmware Confidentiality and Rollback for Vehicles," 10th International Conference on Availability, Reliability and Security (ARES), 2015, IEEE, 10 pages. https://www.researchgate.net/profile/Raja_Naeem_Akram/publication/282006261_Don't_Brick_Your_Car_Firmware_Confidentiality_and_Rollback_for_Vehicles/links/560129ca08ae07629e52bb02.pdf. Retrieved on May 6, 2016.

"everis Connected Car Report." Everis. http://s3-eu-west-1.amazonaws.com/e17r5k-datap1/everis_documents_downloads/everis+connected+car+report.pdf. Last Accessed May 13, 2019. 25 pages.

\* cited by examiner

FACILITATION OF EFFICIENT SOFTWARE DOWNLOADS FOR VEHICLES

TECHNICAL FIELD

This disclosure generally relates to facilitating software downloads for vehicles. More specifically, this disclosure relates to scheduled over-the-air downloads for vehicles based on efficient modeling patterns.

BACKGROUND

Over-the-air programming (OTA) or firmware OTA (FOTA) refers to various methods of distributing new software, configuring settings, and updating encryption keys to devices like cellphones, set-top boxes or secure voice communication equipment (encrypted 2-way radios). One feature of OTA is that one central location can send an update to all the users, who are unable to refuse, defeat, or alter that update, and that the update applies immediately to everyone on the channel.

In the context of the mobile content world these can comprise over-the-air service provisioning (OTASP), over-the-air provisioning (OTAP) or over-the-air parameter administration (OTAPA), or provisioning handsets with the necessary settings with which to access services such as wireless application protocols (WAP) or multimedia messaging services (MMS).

As mobile devices accumulate new applications and become more advanced, OTA configuration has become increasingly important as new updates and services come on stream. OTA via short messaging services (SMS) optimizes the configuration data updates in SIM cards and handsets and enables the distribution of new software updates to mobile devices or provisioning handsets with the necessary settings with which to access services such as WAP or MMS. OTA messaging provides remote control of mobile devices for service and subscription activation, personalization and programming of a new service for mobile operators and telecommunication third parties.

A connected car is a car that is equipped with Internet access, and usually also with a wireless area network. This allows the car to share internet access with other devices both inside as well as outside the vehicle. Often, the car is also outfitted with special technologies that tap into the internet or wireless area network (LAN) and provide additional benefits to the driver. Examples include: automatic notification of crashes, notification of speeding and safety alerts, etc. Concierge features provided by automakers or apps can alert the driver of the time to leave to arrive on time from a calendar, send text message alerts to friends or business associates to alert them of arrival times, and/or help find parking or gas stations.

Connected cars have become a more dominant presence in the network. While the average lifespan of a smartphone is 21 months, a car on the average is scrapped after 8 or more years. Therefore, in order to allow customers to keep up with technological evolution, software updates, which can be facilitated OTA can generate efficiencies.

The above-described background relating to efficient software download for vehicles is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
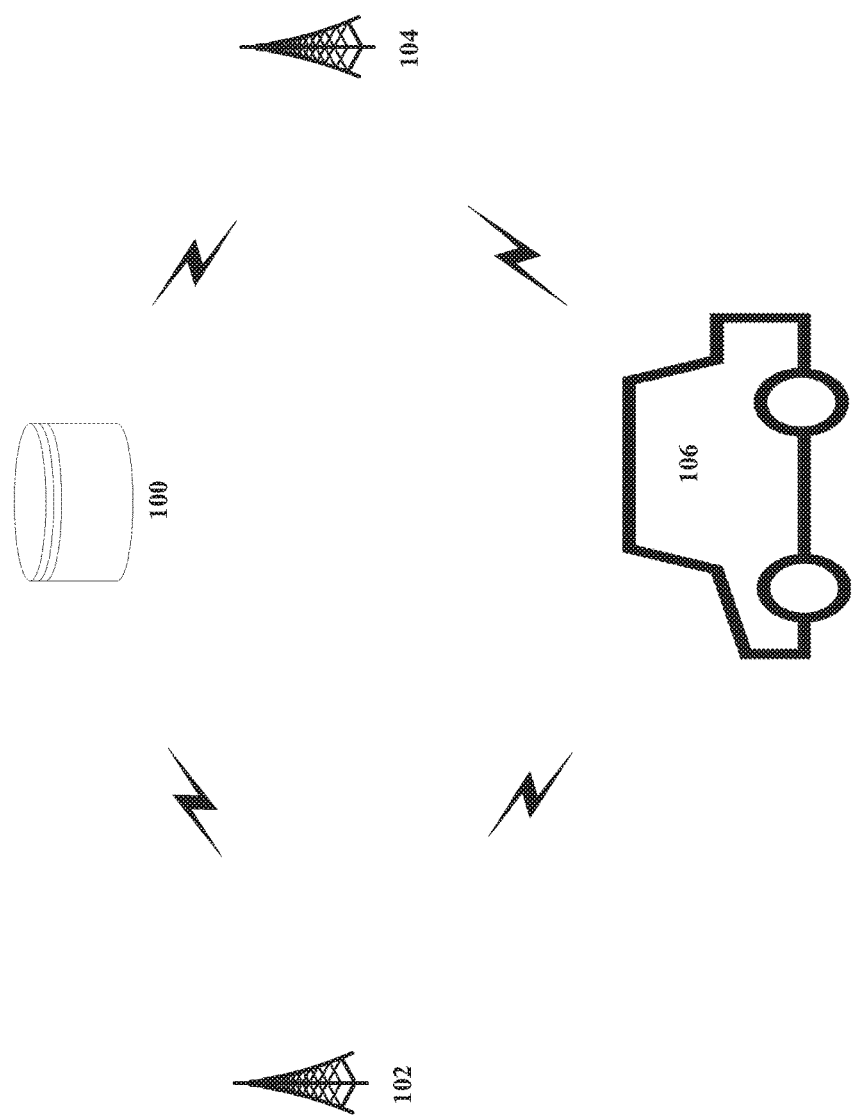
FIG. 1 illustrates an example wireless network comprising a vehicle communicating with the wireless network according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate OTA software pushes from wireless networks to vehicles.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It is noted that although various aspects and embodiments are discussed herein with respect to Universal Mobile Telecommunications System (UMTS) and/or Long Term Evolution (LTE), the disclosed aspects are not limited to a UMTS implementation and/or an LTE implementation. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate OTA software pushes for vehicles. Facilitating OTA software pushes can be implemented in connection with any type of vehicle with a connection to the communications network.

Device-level location analytics coupled with network load and performance metrics at a radio level can be used to create an optimized schedule for an OTA software downloads. Location analytics can be employed to create car segments with similar scheduling characteristics (commute vehicles, weekend vehicles, etc.) and then apply heuristic scheduling to the segments with less network impact, leaving the high impact segments for the optimization. This can result in a reduced problem space for the optimization process and less extensive computation while still producing a highly efficient schedule for software updates.

A scheduler application program interface (API) can be a web service that receives input about an OTA campaign, comprising campaign time-frame, targeted devices, locations, etc. It can be the entry point to the scheduling process initiated by any standard web-based service. Location analytics can comprises session data collected at a resolution of radio sessions. These call detail records can provide location information at the radio level and can telemetrize data sessions. In order to identify the records for a class of cars, an access point name (APN) can be used as a filter.

In general, connected cars can be provisioned into APNs for each original equipment manufacturer (OEM). Each relevant record can comprise the international mobile subscriber identity (IMSI) for the vehicle, the start time, a list of radios that the vehicle was connected to, and the duration of each radio session. Sessions incurred by the relevant OEM can be stored for each day in a file and sorted by the IMSI based on a leading field. Due to the large volume of data, the IMSI can allow quick access to the data.

A smart OTA software scheduler can rely on network metrics to schedule downloads around peak network hours to minimize impact on other users. Network metrics can continuously be collected from the radio network. An important indicator can be the load level of each location (e.g., cell tower or cell sector). For example, a physical resource block (PRB) utilization level (expressed as a percentage) can exist for an LTE network, but another metric can be used for LTE or another technology. In addition, a PRB utilization level can be expressed relative to the amount of data transferred on a downlink, specifically for each cell tower (or sector) because each cell tower can have different capacity in terms of radio carriers or bandwidth. This can allow for computation of how much additional data (FOTA traffic) the cell tower can sustain before exceeding a pre-determined load (e.g., 80% PRB utilization). For example, 25% PRB utilization for 1 GB of data can mean that adding another 1 GB of FOTA traffic would increase total PRB utilization to 50%. In addition, different user populations and other conditions can impact the use of each cell tower on a daily and weekly basis, so a network utilization model can be produced for each of the days of the week. In some cases, it may be sufficient to produce a model for a weekday vs. weekend day or simply use the single model for each day, depending on circumstances. A usage model can also be created for each 15-minute bin, but an hourly model, or any other time interval can be used as appropriate. As network usage evolves over time, the model can be updated to include up to K most recent weeks.

Since schedule optimization can be computationally expensive, vehicle segmentation can be used to segment the cars into groups to reduce costs. Some of the groups can be scheduled immediately, thereby reducing the number of cars sent to the optimizer. Additionally, analysis of each vehicle's past network sessions can be used to estimate relevant properties including, but not limited to: vehicles frequency on a network, repetitive behavior of vehicles, and/or vehicles used only during commute times. For instance, vehicles can exhibit strong repetitive behavior on a daily or weekly level. For example, if a vehicle is used every Sunday morning, or is only ever driven at night, updates can be scheduled during these times because they are off-peak for the network load. It should be noted that off-peak time can be any time where the network load is less than a peak network load. Conversely, vehicles that are only used at commute times or are only seen on the busiest radios could be difficult to schedule, so they might possibly have priority for scheduling by the optimizer. The aforementioned properties others can be used to assign the vehicles to segments.

A heuristic schedule can be based on the car segmentation, or even on a random assignment of vehicles to download times within the campaign. Once a vehicle starts its download, it can continue to receive the updates whenever it is connected to a radio access network (RAN), until either it is complete or the campaign window ends. A simulation tool can be used to compare a heuristic schedule with an optimized schedule. The simulation tool can quantify the degree of additional stress on the RAN when the schedule is not optimized, as well as the number of extra vehicles that will fail to complete the download under non-optimal conditions.

A schedule optimizer can use the metrics from the location data. The optimizer can be composed of two components: 1) a learning machine and 2) a scheduler. The learning machine can provide several vehicles' orderings/permutations to be used to build the schedule. After the schedule has been built for the scheduler, a makespan, which is a total length of the schedule, or other chosen metric can be fed back into the learning machine to be used as a performance metric in the learning process. For example, a biased random-key genetic algorithm can be used as the learning machine, but any package providing the same or substantially similar functionality can work. It should be noted that other genetic algorithms (considered as machine-learning algorithms) and other types of optimization frameworks can be used including, but not limited to: tabu search, simulated annealing, swarm optimization (ant colony optimization, particle swarm optimization, and other variants), variable neighborhood search, greedy randomized adaptive search procedures, branch-and-bound, branch-and-cut, branch-and-price (and their combinations), robust optimization. The scheduler can work with a list of vehicles in a given order provided by the learning machine. For each vehicle in this order, the schedule can allocate a download slot for that vehicle constrained to the network metrics (for example, maximum utilization of PRBs in a given sector or radio). The result is a list of vehicles with the times when these vehicles should start the download. The makespan and other metrics can also be computed and returned to the learning machine. Note that since the scheduling process can be applied to independent vehicle orderings, it can be done in parallel. This process can be iterated several times until a given stopping criterion is met. The stopping criteria can be maximum running time and convergence detection (a given number of iterations without improvement in the solution).

The last process in the pipeline can be the gathering of output from the heuristic scheduler and optimizing scheduler into a campaign schedule in an extensible markup language (XML). This schedule can be communicated to the campaign manager using the API.

It should also be noted that an artificial intelligence (AI) component can facilitate automating one or more features in accordance with the disclosed aspects. A memory and a processor as well as other components can include functionality with regard to the figures. The disclosed aspects in connection with OTA software pushes for vehicles can employ various AI-based schemes for carrying out various aspects thereof. For example, a process for detecting one or more trigger events, reducing a software push as a result of the one or more trigger events, and modifying one or more reported measurements, and so forth, can be facilitated with an example automatic classifier system and process.

An example classifier can be a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that can be automatically performed. In the case of OTA software pushes, for example, attributes can be a frequency band and a technology and the classes can be an output network capacity reduction value.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to modifying a software push, modifying one or more reported mobility measurements, and so forth. The criteria can include, but is not limited to, predefined values, frequency attenuation tables or other parameters, service provider preferences and/or policies, and so on.

In one embodiment, described herein is a method comprising receiving network capacity data representing a network capacity of network devices of a wireless network, and receiving vehicle location data associated with a location of a vehicle in relation to a base station device of the wireless network. Thereafter, network connection data associated with a frequency of a radio of the vehicle connecting to the base station device can be received, and based on the network resource data, the vehicle location, and the network connection data, generating, by the wireless network device, resource schedule data associated with a schedule for a resource deliverable by the wireless network device to be sent to the radio of the vehicle.

According to another embodiment, a system can facilitate, the OTA software pushes by receiving location data associated with locations of vehicles in relation to a base station device associated with a wireless network, and receiving connection data associated with wireless connections of the vehicles to the base station device. Based on the location data and the connection data, segmenting the vehicles, resulting in a first vehicle segment and a second vehicle segment. In response to the segmenting the vehicles, generating a firmware push schedule associated with pushing firmware to the vehicles, and sending the firmware to the vehicles in accordance with the firmware push schedule. It should be noted that although a vehicle segment can comprise multiple vehicles, the firmware push does not necessarily need to be performed at the same time for all of the vehicles within the vehicle segment. For instance, a firmware push can be performed at various times for each vehicle within the vehicle segment.

According to yet another embodiment, described herein is a machine-readable storage medium that can perform the operations comprising generating a first defined order associated with vehicles connected to network devices of a wireless network, and allocating first time slots related to the first defined order. Based on allocating the first time slots, generating a first schedule associated with sending firmware to the vehicles. In response to sending the firmware to the vehicles in accordance with first schedule, analyzing network performance data associated with a performance of the network devices of the wireless network, resulting in a network analysis. Based on an output of the network analysis, generating a second defined order associated with the vehicles, and allocating second time slots related to the second defined order. Based on the allocating the second time slots, generating a second schedule associated with sending the firmware to the vehicles, and sending the firmware to the vehicles in accordance with the second schedule to increase a metric relating to the performance of the network devices of the wireless network.

These and other embodiments or implementations are described in more detail below with reference to the drawings.

Referring now to FIG. 1, illustrated is an example wireless network comprising a vehicle communicating with the wireless network according to one or more embodiments. A wireless network can comprise a data repository 100 that can communicate with base stations 102, 104. The base stations 102, 104 can also communicate with a vehicle 106. Data related to how much time the vehicle spends communicating with base stations 102, 104 can be used to build a scheduling system for OTA software pushes to the vehicle 106. For example, the system can note that the vehicle 106 spends 60% of its time communicating with the base station 104 and only 40% of its time communicating with the base station 102 during its daily commute time. This information can be stored in the data repository 100.

Additional information regarding network capacity can also be stored in the data repository 100. For example, based on common traffic patterns, the system can note that the base station 104 is generally at 85% capacity during the daily commute time where the base station 102 is only 40% capacity during the daily commute time. Consequently, based on an analysis of this data by the system, the system can determine that it may be more efficient to provide OTA software pushes to the vehicle 106 during the latter portion of its commute while it is communicating with the base station 102 to mitigate the possibility of the OTA software push bringing the base station 102 to its capacity. It should be noted that this dynamic analysis can be performed for several vehicles and base stations simultaneously to generate the most efficient outcome for the OTA software push. Multiple vehicles can also be segmented into groups based on a similar analysis where the segmentation can take into account the vehicles that normally communicate with the base stations 104, 102 with approximately a 60%/40% split.

Figure 2:
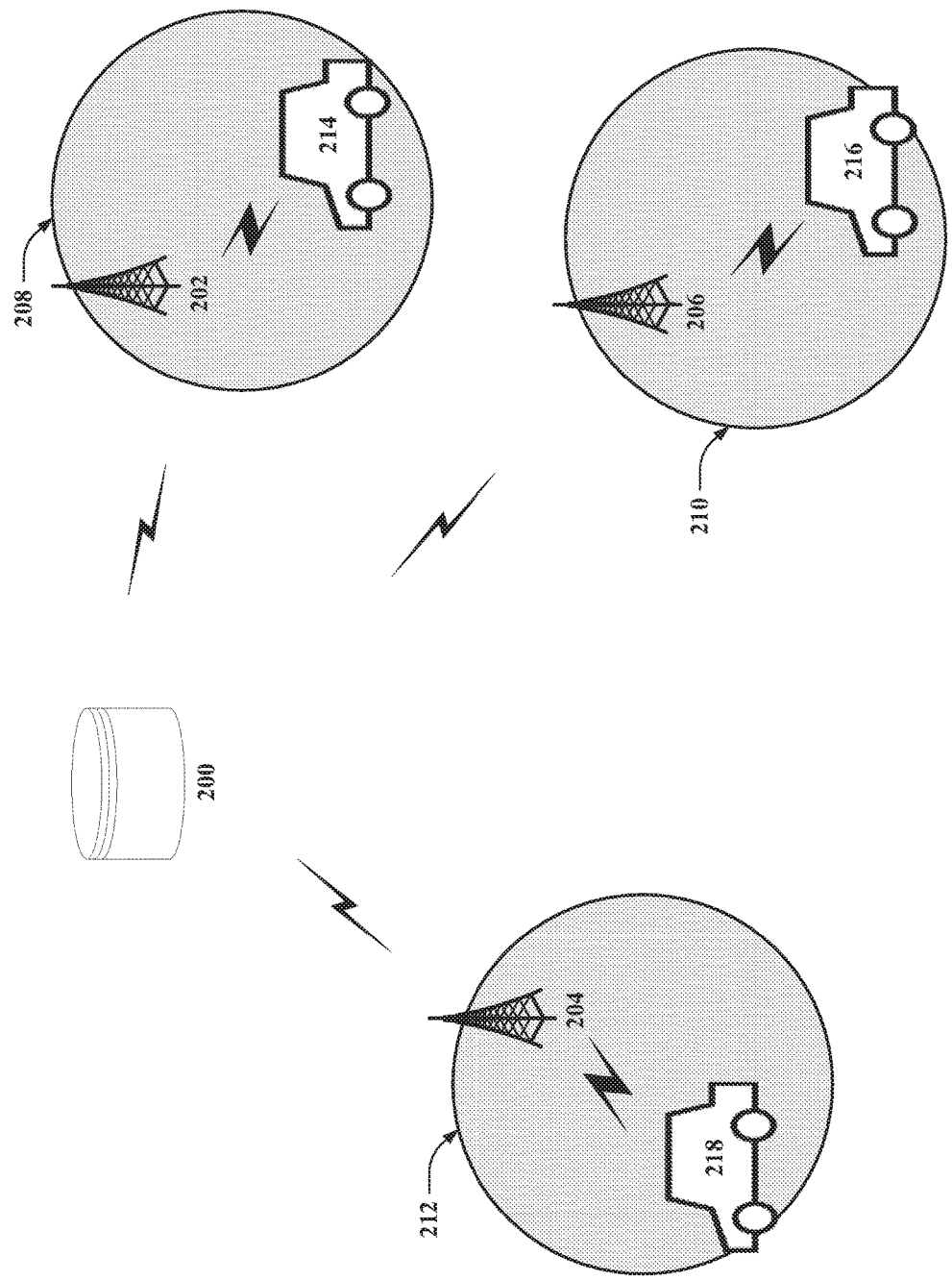
FIG. 2 illustrates an example wireless network performing OTA software pushes to vehicles based on their location according to one or more embodiments.

Referring now to FIG. 2, illustrated is an example wireless network performing OTA software pushes to vehicles based on their location according to one or more embodiments. OTA software pushes can also be a function of location. A data repository 200 can store data related to communication between vehicles 214, 216, 218, and base stations 202, 204, 206. The communication can comprise where the vehicles 214, 216, 218 are in relation to the base stations 202, 204, 206. For instance, are the vehicles 214, 216, 218 within a defined zone 208, 2010, 212 associated with the base stations 202, 204, 206. If the vehicles 214, 216, 218 are within the defined zones 208, 2010, 212, then an OTA software push can occur.

The OTA software push can also be predicated on a network capacity associated with the base stations 202, 204, 206. The system can determine not to send an OTA push via the base station 202 to the vehicle 214 because the base station 202 has been determined to be at or near capacity. However, the system can send the vehicle 216 an OTA software push via the base station 206 because the vehicle is within the defined zone 210 even though the base station 206 might be near capacity. Effectively, the system can prioritize the OTA pushes based on plurality of factors such as: time, location, capacity, route, segmentation, frequency, reoccurrences, etc.

Figure 3:
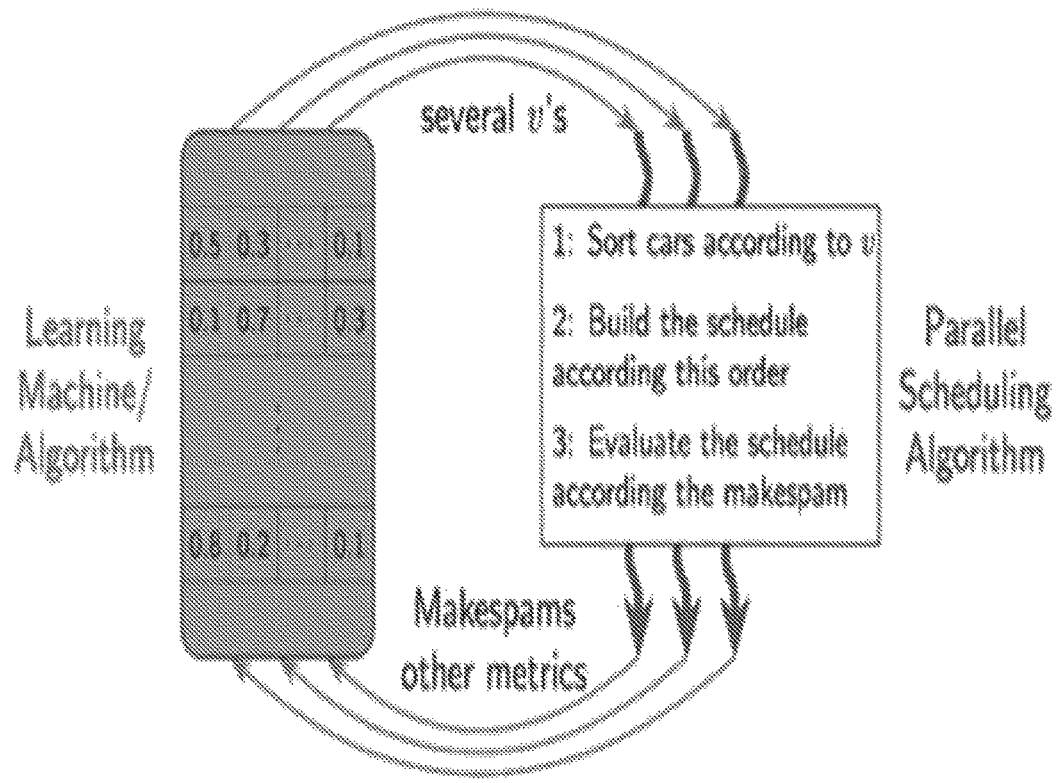
FIG. 3 illustrates a learning procedure of an example wireless network performing OTA software scheduling according to one or more embodiments.

Referring now to FIG. 3, illustrated is a learning procedure of an example wireless network performing OTA software scheduling according to one or more embodiments. Given a vector v from the learning algorithm, a schedule is built with respect to v, and then, the makespan or any other metric is fed back into the learning algorithm. A Schedule optimizer can be composed of two components: 1) a learning machine and 2) a scheduler. The learning machine can first provide several vehicles' orderings/permutations to be used to build the schedule and send the orders to the scheduler. The scheduler can begin by sorting vehicles according to some condition. After the schedule has been built for the scheduler, a makespan or other chosen metric can be fed back into the learning machine to be use as a performance metric in the learning process. Then the scheduler can then build a schedule according to the sorting the vehicles, and evaluate the schedule according to the makespan prior to sending the metrics to the learning machine. The scheduler can also work with a list of vehicles in a given order provided by the learning machine. For each vehicle in this order, the scheduler can allocate a download slot for that vehicle constrained to the network metrics including, but not limited to: network capacity, location, time, etc. This process can be iterated several times until a given stopping criterion is met.

Figure 4:
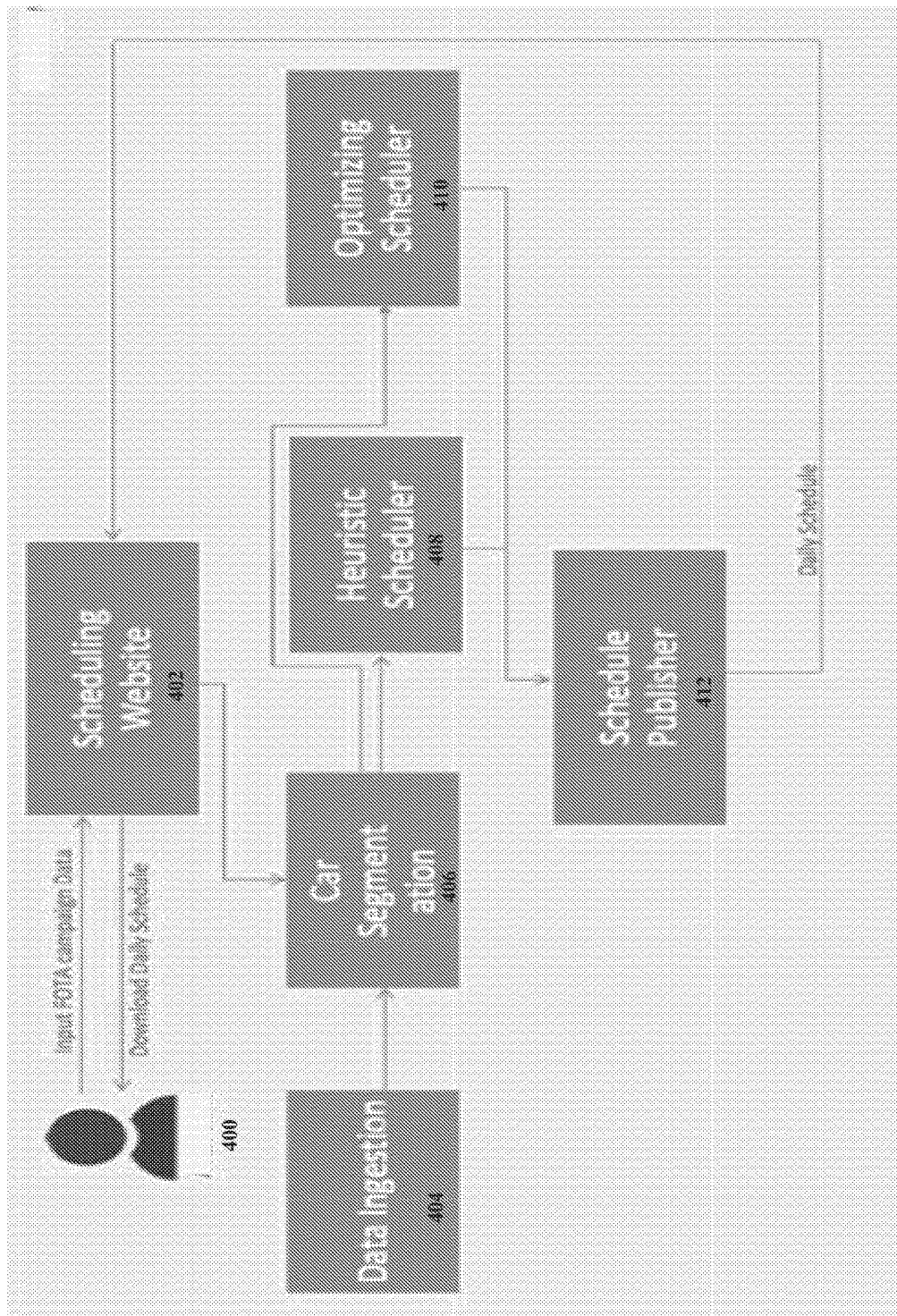
FIG. 4 illustrates an example schematic system block diagram of an OTA scheduling process according to one or more embodiments.

Referring now to FIG. 4, illustrated is an example schematic system block diagram of an OTA scheduling process according to one or more embodiments. A user identity 400 can leverage a scheduling website 402 to facilitate an OTA software push. Based on the user identity 400 input received by the scheduling website 402, various vehicles can be segmented based on criterion (time, capacity, bandwidth, location, etc.) set by the user identity 400. The vehicle segmentation can also comprise data ingestion 404, which can be compared to any/all of the criterion input by the user identity 400. After the vehicle segmentation 406, a heuristic scheduler 408 or an optimizing scheduler can be used to generate an OTA software push schedule in accordance with the user identity 400 inputs and the data ingestion 404. Additionally, once the schedule is generated, it can be published by a schedule publisher 412, which can then send the published schedule back to the scheduling website 402.

Figure 5:
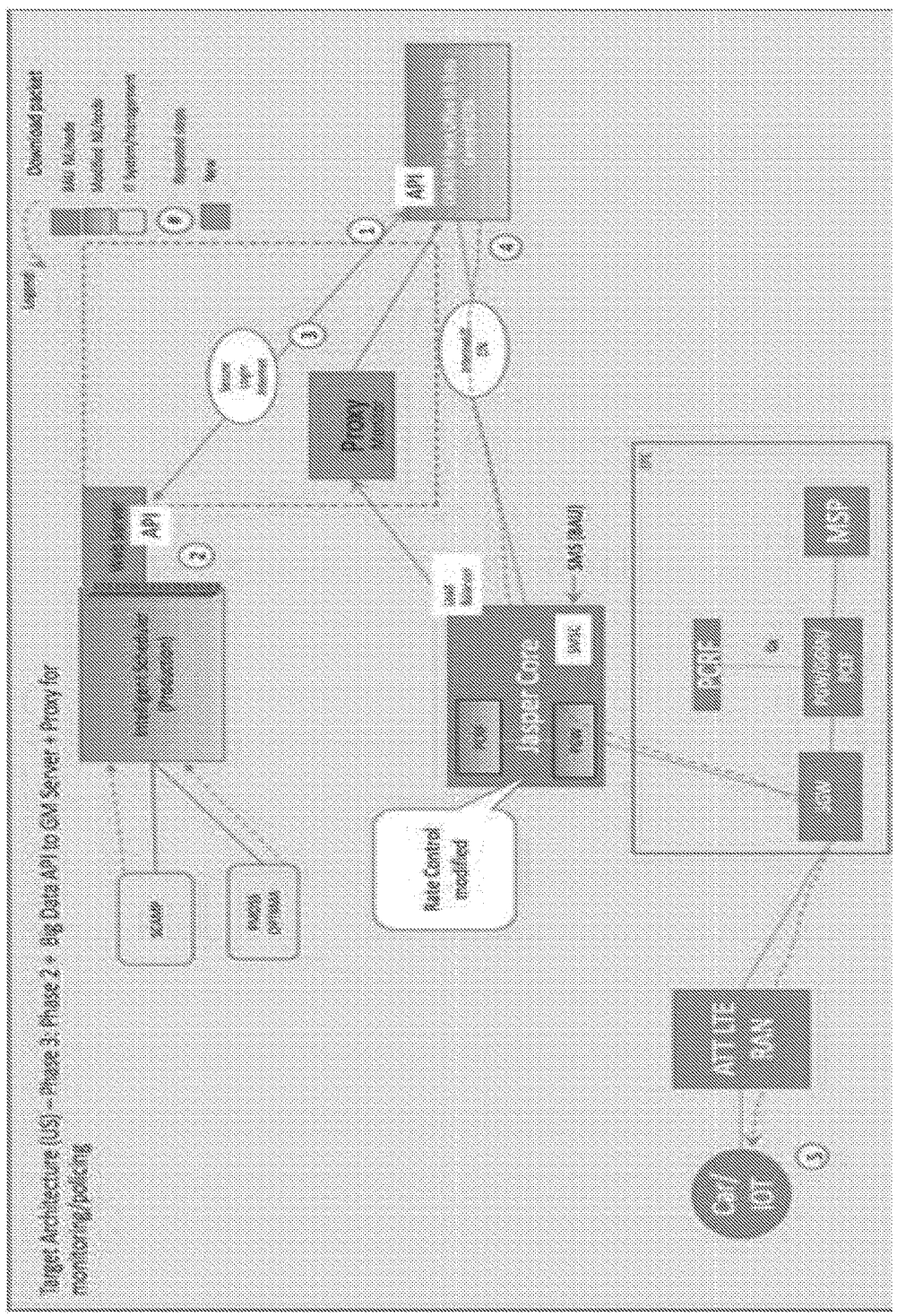
FIG. 5 illustrates an example wireless network architecture for OTA software scheduling for a vehicle according to one or more embodiments.

Referring now to FIG. 5, illustrated is an example wireless network architecture for OTA software scheduling for a vehicle according to one or more embodiments. The process for an FOTA campaign, can entail an auto OEM sending a request for a FOTA campaign initiation to service provider scheduler via an API. The request can contain information concerning the FOTA campaign that includes the FOTA package size, a list of targeted vehicles, and start and end dates of the campaign. Using the request information, the vehicles' behavior can be derived from the service provider's network data, the network load and performance data, and the service provider scheduler can compute the most effective schedule for the requested FOTA campaign. The schedule can comprise the list of targeted vehicles and their optimal dates and times for downloading the software update. Consequently, the service provider scheduler can invoke an API to transmit the computed schedule to the auto OEM. After the schedule is received, the auto OEM can begin to send out short message service SMS notification to the targeted vehicles based on the computed download dates and times. The vehicle can then receive the SMS notification, acknowledge it, and initiate the software download from the auto OEM back office via wireless network communication protocols associated with the vehicle.

Figure 6:
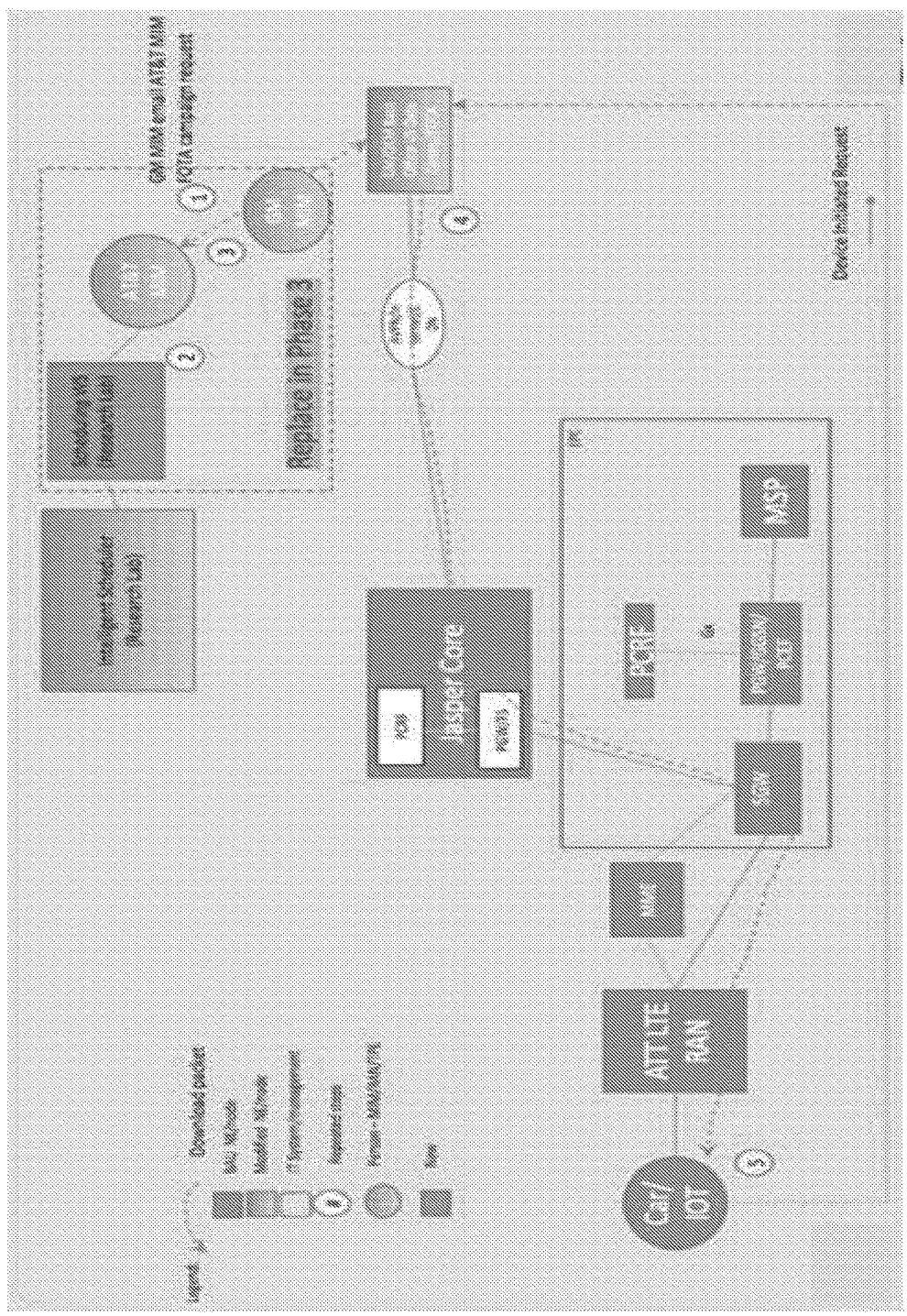
FIG. 6 illustrates an example wireless network architecture for OTA software scheduling for a vehicle according to one or more embodiments.

Referring now to FIG. 6, illustrated is another example wireless network architecture for OTA software scheduling for a vehicle according to one or more embodiments. To initiate a FOTA campaign, an auto OEM representative can contacts a service provider representative with the FOTA campaign request. The request can comprise information concerning the FOTA campaign that comprises the FOTA package size, a list of targeted cars, and start and end dates of the campaign. The service provider representative can upload the campaign request information onto the service provider scheduler web server. Using the request information, the vehicles behavior can be derived from the service provider network data, the network load and performance data, and the service provider scheduler can compute the most effective schedule for the requested FOTA campaign. The schedule can comprise the list of targeted vehicles and their optimal dates and times for downloading the software update. Once the schedule is completed, the service provider scheduler can notify the service provider representative of such. The service provider representative can then download the computed schedule from the service provider scheduler web server and share it with the auto OEM representative who can then upload the schedule onto the OEM back office. Once the schedule is received, the auto OEM can begin sending out SMS notifications to the targeted vehicles based on the computed download dates and times. The vehicle can receive the SMS notification, acknowledge it, and initiate the software download from the auto OEM back office via wireless network communication protocols associated with the vehicle.

Figure 7:
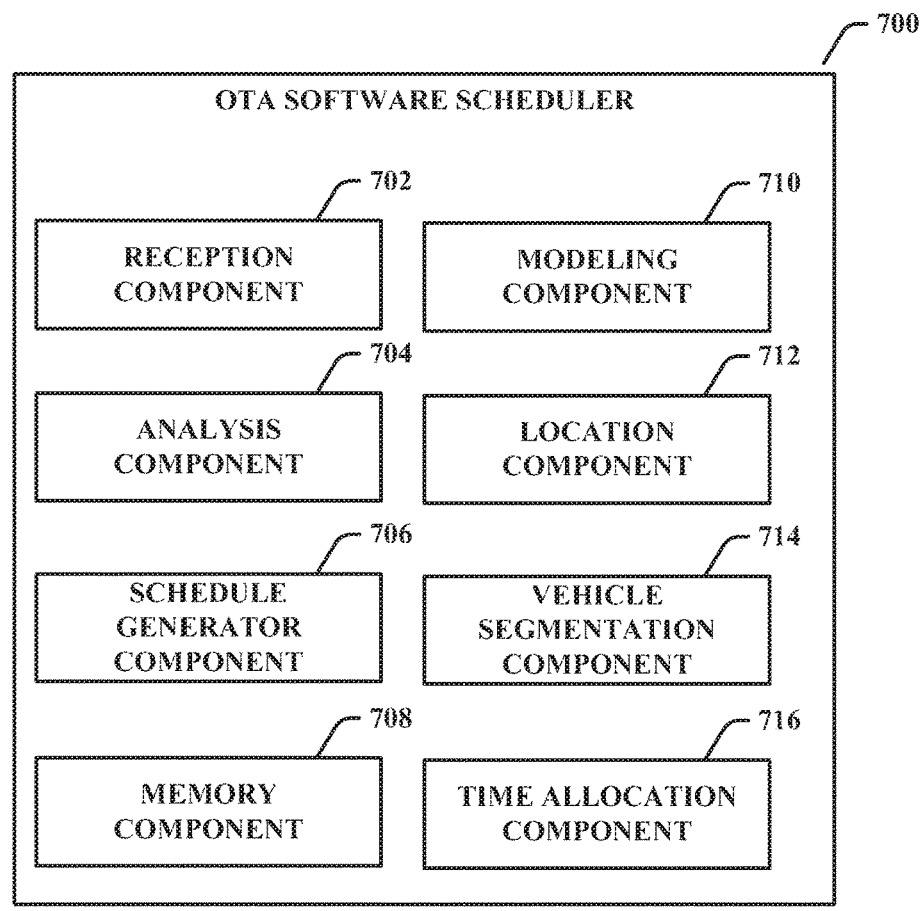
FIG. 7 illustrates an example schematic system block diagram for a OTA software scheduler component according to one or more embodiments.

Referring now to FIG. 7, illustrated is an example schematic system block diagram for an OTA software scheduler component according to one or more embodiments. The OTA software scheduler 700 can comprise a reception component 702 for receiving data from a user identity and/or a vehicle network activity data. An analysis component 704 can analyze and compare the data received from the user identity to the vehicle network activity data, which can then be modeled via a modeling component 710. A location component 712 can be configured to track the location of vehicles and a time allocation component 716 can be configured to track the amount of time vehicles communication with a specific base station device. Consequently, time allocation data and location data can be used as inputs to the analysis component 704 and the modeling component 710 prior to a schedule generator component 706 generating an output schedule. The schedule generator component 706 can also output vehicle segmentation data and time allocation data. Data related to all of the aforementioned components can be stored in a memory component 708 for access and utilization at various stages of the OTA software scheduler process.

Figure 8:
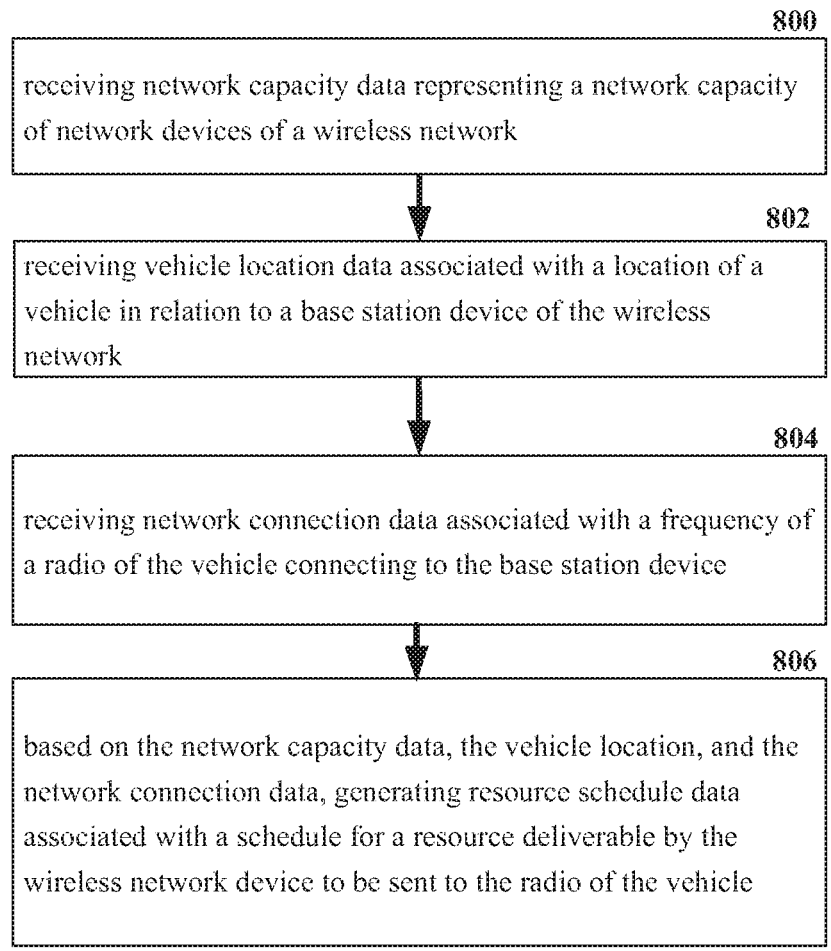
FIG. 8 illustrates an example schematic system block diagram for facilitating OTA software based on resource data according to one or more embodiments.

Referring now to FIG. 8, illustrated is an example schematic system block diagram for facilitating OTA software based on resource data according to one or more embodiments. At element 800, network capacity data representing a network capacity of network devices of a wireless network can be received. Base station devices can have a network capacity associated with their operation. The network capacity can be predefined based on system requirements or it can be dynamic based on a time of day (i.e., commute times). At element 802, vehicle location data associated with a location of a vehicle in relation to a base station device of the wireless network can be received. Vehicle location data can be used to assess vehicle's day-to-day patterns and interactions/communications with the base stations. Additionally, network connection data associated with a frequency of a radio of the vehicle connecting to the base station device can be received at element 804, and, based on the network resource data, the vehicle location, and the network connection data, resource schedule data associated with a schedule for a resource deliverable by the wireless network device to be sent to the radio of the vehicle can be generated at element 806. Thus, the collected data can be used to model an efficient schedule for OTA software pushes and issue OTA software in accordance with the schedule.

Figure 9:
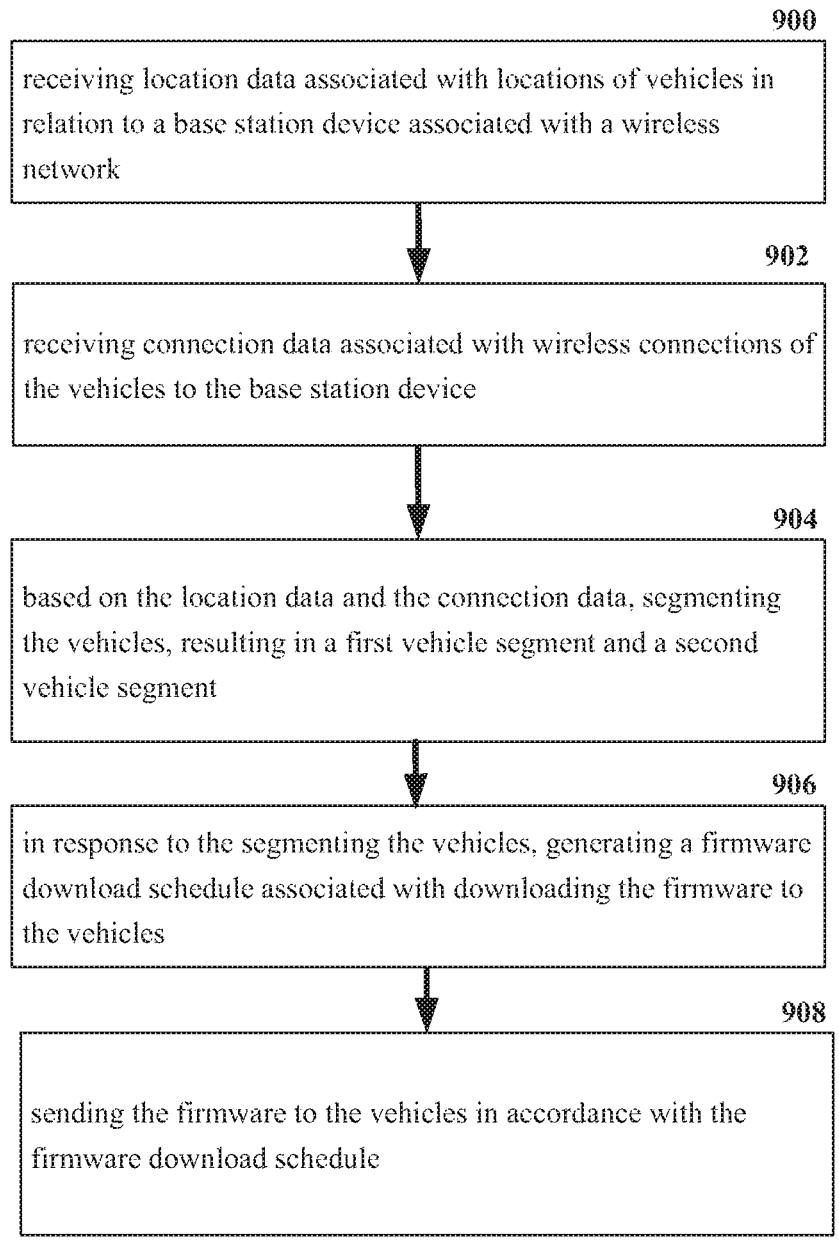
FIG. 9 illustrates an example schematic system block diagram for facilitating OTA software based on a segmentation process according to one or more embodiments.

Referring now to FIG. 9, illustrated is an example schematic system block diagram for facilitating OTA software based on a segmentation process according to one or more embodiments. At element 900, a system can receive location data associated with locations of vehicles in relation to a base station device associated with a wireless network. Location data and time data related to vehicle sessions on particular base station devices can be used as inputs to the system. At element 902, connection data associated with wireless connections of the vehicles to the base station device can be received. After the connection data is received, it can be stored, analyzed against any defined parameters and used to segment vehicles. Based on the location data and the connection data, the vehicles can be segmented at element 904, resulting in a first vehicle segment and a second vehicle segment. The vehicle segmentation can dictate which vehicles should receive OTA software downloads together/separately. In response to the segmenting the vehicles, at element 906 a firmware download schedule associated with downloading firmware to the vehicles can be generated; and the firmware can be sent to the vehicles in accordance with the firmware download schedule at element 908.

Figure 10:
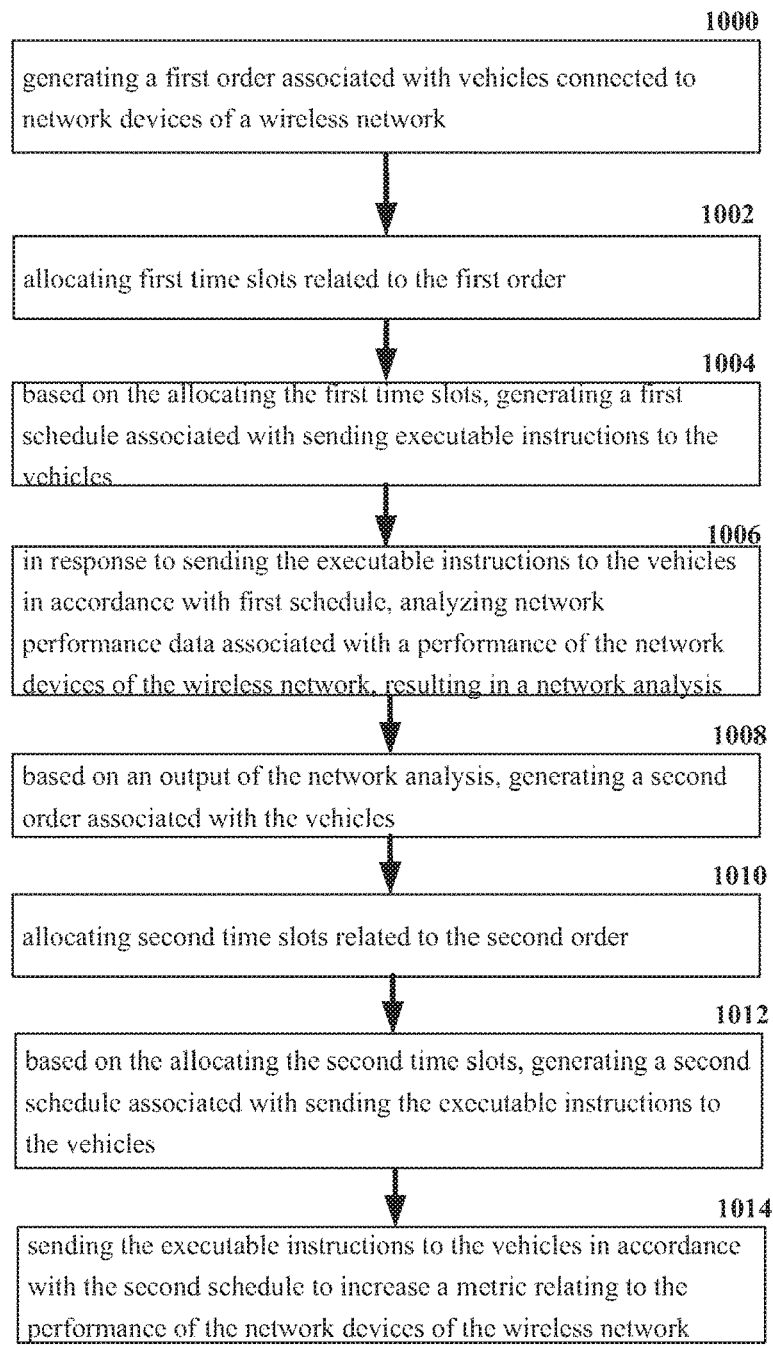
FIG. 10 illustrates an example schematic system block for facilitating OTA software based on an adaptive scheduling process according to one or more embodiments.

Referring now to FIG. 10, illustrated is an example schematic system block for facilitating OTA software based on an adaptive scheduling process according to one or more embodiments. At element 1000, a first order associated with vehicles connected to network devices of a wireless network can be generated, and at element 1002, first time slots related to the first order can be allocated. An order can be associated with how OTA software pushes are sent to the vehicles, wherein each vehicle can be provided a time slot for the OTA software push. Based on the allocating the first time slots, a first schedule associated with sending executable instructions to the vehicles can be generated at element 1004. The first schedule generated can be dynamically updated in accordance with a data convergence process. In response to sending the executable instructions to the vehicles in accordance with first schedule, network performance data associated with a performance of the network devices of the wireless network can be analyzed at element 1006, resulting in a network analysis. The network analysis can determine that the first schedule was not or is not the most efficient scheduling process and consequently amend the schedule to reflect a more efficient scheduling process. Based on an output of the network analysis, a second order associated with the vehicles can be generated at element 1008. At element 1010, second time slots related to the second order can be allocated, and based on the allocating the second time slots, a second schedule associated with sending the executable instructions to the vehicles can be generated at element 1012. Thereafter, the executable instructions can be sent to the vehicles at element 1014 in accordance with the second schedule to increase a metric relating to the performance of the network devices of the wireless network.

Figure 11:
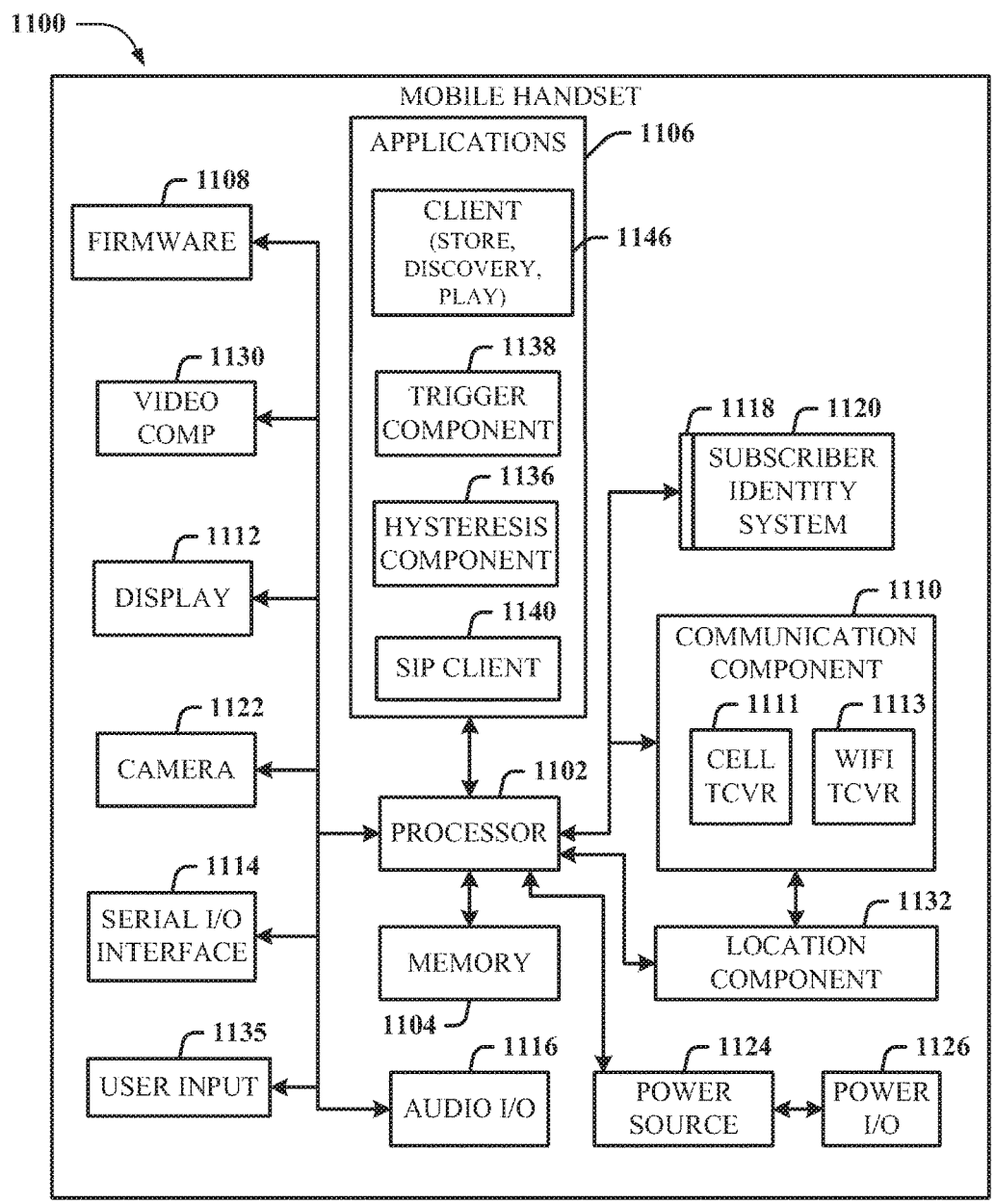
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
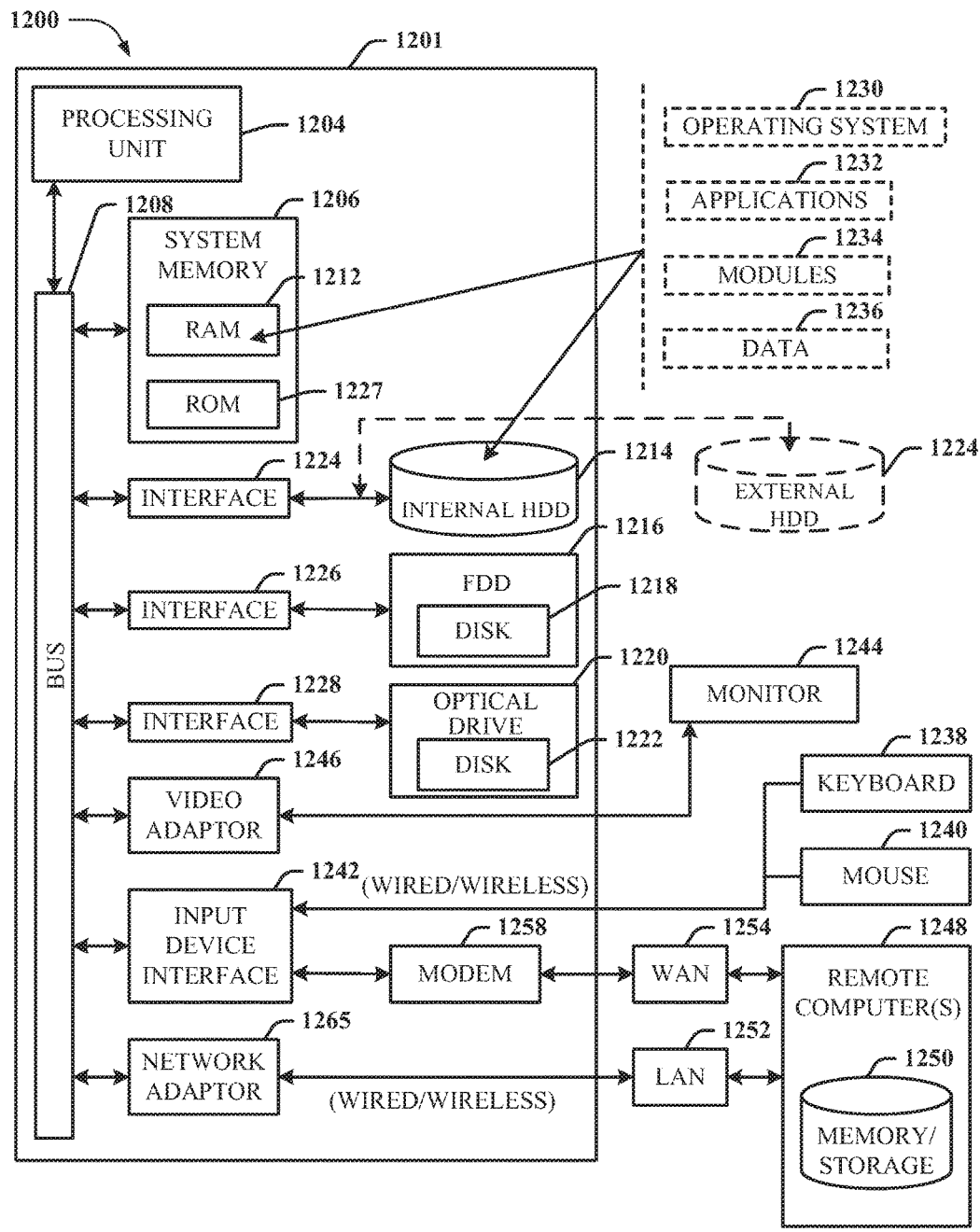
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a wireless network device comprising a processor, network capacity data representing a network capacity of network devices of a wireless network;
   receiving, by the wireless network device, vehicle location data associated with a location of a vehicle in relation to a base station device of the wireless network;
   receiving, by the wireless network device, network connection data associated with a frequency of a radio of the vehicle connecting to the base station device, which the vehicle utilizes, during a commute time;
   in response to the receiving the network connection data that the vehicle utilizes during the commute time, generating, by the wireless network device, segmentation data associated with grouping the vehicle with a group of vehicles based on the network connection data and the commute time;
   generating, by the wireless network device, traffic pattern data associated with traffic patterns of the group of vehicles;
   based on the frequency of the radio of the vehicle connecting to the base station device the commute time of the vehicle, and the segmentation data, generating, during a peak time, priority data associated with a priority of the vehicle to receive a resource to be delivered to the vehicle, wherein the resource comprises firmware applicable for use by the vehicle;
   based on the network capacity data, the vehicle location data, the traffic pattern data, and the priority data, generating, by the wireless network device, resource schedule data associated with a schedule for the resource deliverable by the wireless network device to be sent to the radio of the vehicle during the peak time associated with the network capacity; and
   sending, by the wireless network device, the firmware to the vehicle.

2. The method of claim 1, wherein the network connection data comprises time data related to an amount of time that the radio of the vehicle has been connected to the base station device.

3. The method of claim 2, wherein the network capacity data comprises downlink data associated with transferring the resource, wherein the resource is firmware, to the wireless network device on a downlink of the base station device.

4. The method of claim 1, wherein the generating the resource schedule data is in response to determining that a condition associated with the network capacity has been determined to have been satisfied.

5. The method of claim 1, wherein the resource schedule data is modeled using a predictable periodic network utilization pattern.

6. The method of claim 1, wherein the resource schedule data is generated for a weekend.

7. The method of claim 1, wherein the resource schedule data is modeled after an hourly network utilization pattern.

8. A system, comprising:
a processor; and
a memory that stores executable instructions that, when executed by the processor, facilitate performance of operations, comprising:
receiving network capacity data representing a network capacity of network devices of a wireless network;
receiving vehicle location data associated with a location of a vehicle in relation to a base station device of the wireless network;
receiving network connection data associated with a frequency of a radio of the vehicle connecting to the base station device during a commute time;
based on the receiving the network connection data and the commute time:
grouping the vehicle in a group of vehicles, resulting in grouping data, and
generating priority data associated with a priority of the group of the vehicles to receive firmware; and
generating traffic pattern data associated with traffic patterns of the group of vehicles;
based on the network capacity data, the vehicle location data, the commute time, the traffic pattern data, the priority data, and the grouping data, generating, during a peak time, a firmware download schedule associated with downloading the firmware to the group of vehicles; and
in response to the generating the firmware download schedule, transmitting the firmware to the vehicle.

9. The system of claim 8, wherein the network connection data comprises time data associated with an amount of time that the group of vehicles have been wirelessly connected to the base station device.

10. The system of claim 9, wherein the time data comprises a start time and an end time.

11. The system of claim 9, wherein the operations further comprise:
analyzing the time data for repetitive occurrences, resulting in cyclical time data related to cycles of time that the group of vehicles have been wirelessly connected to the base station device.

12. The system of claim 8, wherein the operations further comprise:
in response to determining a load capacity associated with the wireless network, determining an off-peak time.

13. The system of claim 12, wherein the off-peak time is associated with a reduced load capacity, and wherein the reduced load capacity is lower than the load capacity.

14. The system of claim 13, wherein the operations further comprise:
sending the firmware to the group of vehicles, wherein the sending comprises sending the firmware to the vehicle of a vehicle segment based on an indication that the vehicle of the vehicle segment wirelessly connects to the base station device during the off-peak time.

15. A machine-readable storage medium, comprising executable instructions that, when executed by a processor, facilitate performance of operations, comprising:
analyzing network performance data associated with a performance of network devices of a wireless network, resulting in network capacity data;
receiving vehicle location data associated with a location of a vehicle in relation to a base station device of the wireless network;
receiving network connection data associated with a frequency of a radio of the vehicle connecting to the base station device, which the vehicle utilizes during a commute time;
based on the frequency of the radio of the vehicle connecting to the base station device, generating priority data associated with a priority of the vehicle to receive a resource to be delivered to the vehicle, wherein the resource is firmware applicable for use by the vehicle;
based on the receiving the network connection data, grouping the vehicle in a group of vehicles, resulting in grouping data;
generating traffic pattern data associated with traffic patterns of the group of vehicles; and
based on the network capacity data, the vehicle location data, the traffic pattern data, the commute time of the vehicle, the priority data, and the grouping data, generating, during a peak time, a schedule associated with sending instruction data to the group vehicles; and
in response to the generating the schedule, sending the firmware to the vehicle.

16. The machine-readable storage medium of claim 15, wherein the operations further comprise:
determining a network capacity associated with the network devices of the wireless network.

17. The machine-readable storage medium of claim 15, wherein the operations further comprise:
determining a time associated with a wireless connection of the group of vehicles to a network device of the network devices of the wireless network.

18. The machine-readable storage medium of claim 15, wherein the sending the instruction data comprises:
sending the instruction data to the group of vehicles in accordance with the schedule to increase a metric relating to the performance of network devices of the wireless network.

19. The machine-readable storage medium of claim 15, wherein the operations further comprise:
in response to determining that a condition associated with a time has been satisfied, generating a first defined order related to allocating a time slot to the vehicle.

20. The machine-readable storage medium of claim 19, wherein the peak time related to a decreased network capacity, and wherein the decreased network capacity is less than the network capacity.

* * * * *